United States Patent [19]
Greenfield et al.

[11] Patent Number: 5,518,407
[45] Date of Patent: May 21, 1996

[54] ANATOMICALLY CORRECT ARTIFICIAL ORGAN REPLICAS FOR USE AS TEACHING AIDS

[76] Inventors: Cathy L. Greenfield, 884 County Rd. 700 E, Champaign, Ill. 61821; Ann L. Johnson, 506 Witt Park Rd., Sidney, Ill. 61877

[21] Appl. No.: 144,442

[22] Filed: Nov. 2, 1993

[51] Int. Cl.⁶ .................................................. G09B 23/28
[52] U.S. Cl. ......................................... 434/272; 434/267
[58] Field of Search ................................. 434/272, 267, 434/262

[56] References Cited

U.S. PATENT DOCUMENTS

| | | |
|---|---|---|
| 2,324,702 | 7/1943 | Hoffmann et al. |
| 2,495,568 | 1/1950 | Coel. |
| 2,678,505 | 5/1954 | Munson. |
| 2,763,070 | 9/1956 | McCormick. |
| 2,971,272 | 2/1961 | Barlow. |
| 2,988,823 | 6/1961 | Rosenbloom ............... 434/272 |
| 4,312,826 | 1/1982 | Colvin. |
| 4,773,865 | 9/1988 | Baldwin ................ 434/267 X |
| 4,789,340 | 12/1988 | Zikria ..................... 434/272 |

FOREIGN PATENT DOCUMENTS

| | | | |
|---|---|---|---|
| 0807357 | 2/1981 | U.S.S.R. .................. 434/272 |
| 93021619 | 10/1993 | WIPO ..................... 434/272 |

Primary Examiner—Gene Mancene
Assistant Examiner—Jeffrey A. Smith
Attorney, Agent, or Firm—Jacobson, Price, Holman & Stern

[57] ABSTRACT

Teaching aids or training aids in the form of organ replicas or organ models each of which is anatomically correct and has the shape, size, vascular components and attachments that are found in live organs in various animals, humans and the like to facilitate teaching or training of students or other individuals in various medical or veterinarian practices. The training aid includes a body cavity model in which the interior is a replica of the inside of the abdominal area with all of the contours that are normally present and the exterior is a replica of the shape of the outside of the abdominal area with a relatively large hole or opening formed in the upper surface to allow for surgical exposure of the organ replicas or models positioned within the abdominal cavity. The organ replicas or models closely simulate living organs in texture, color, consistency and handling properties to form the replicas or models as lifelike as possible with the organ models feeling, handling, capable of being cut and sutured in the same manner as live organs with the colors of the organ models being determined by color matching each organ model with the color of an actual live organ during a surgical procedure. The organ replicas or models are held in the body cavity in apposed relation by retaining structures to maintain the relationship of the organ replicas in the body cavity in a manner similar to live organs being retained in the body cavity.

10 Claims, 10 Drawing Sheets

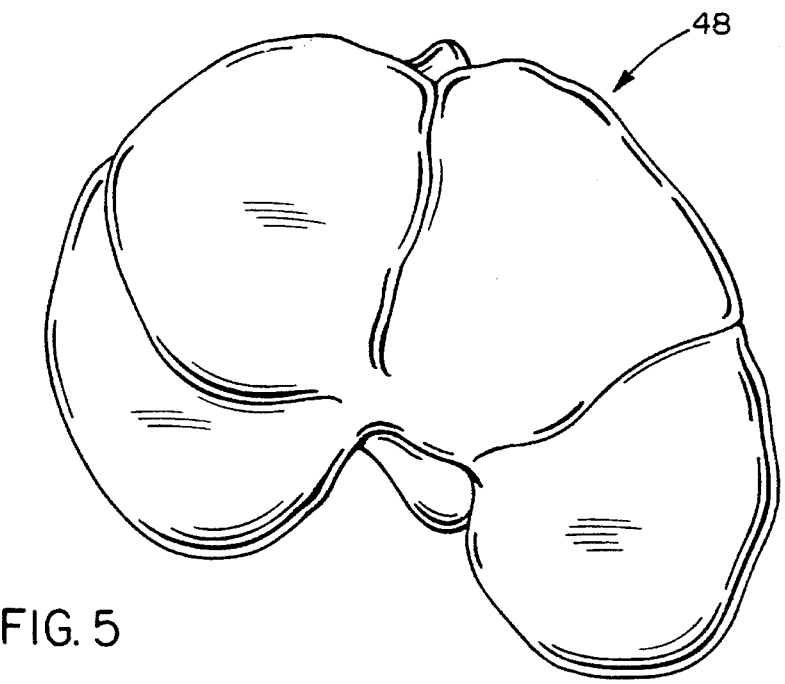
FIG. 5
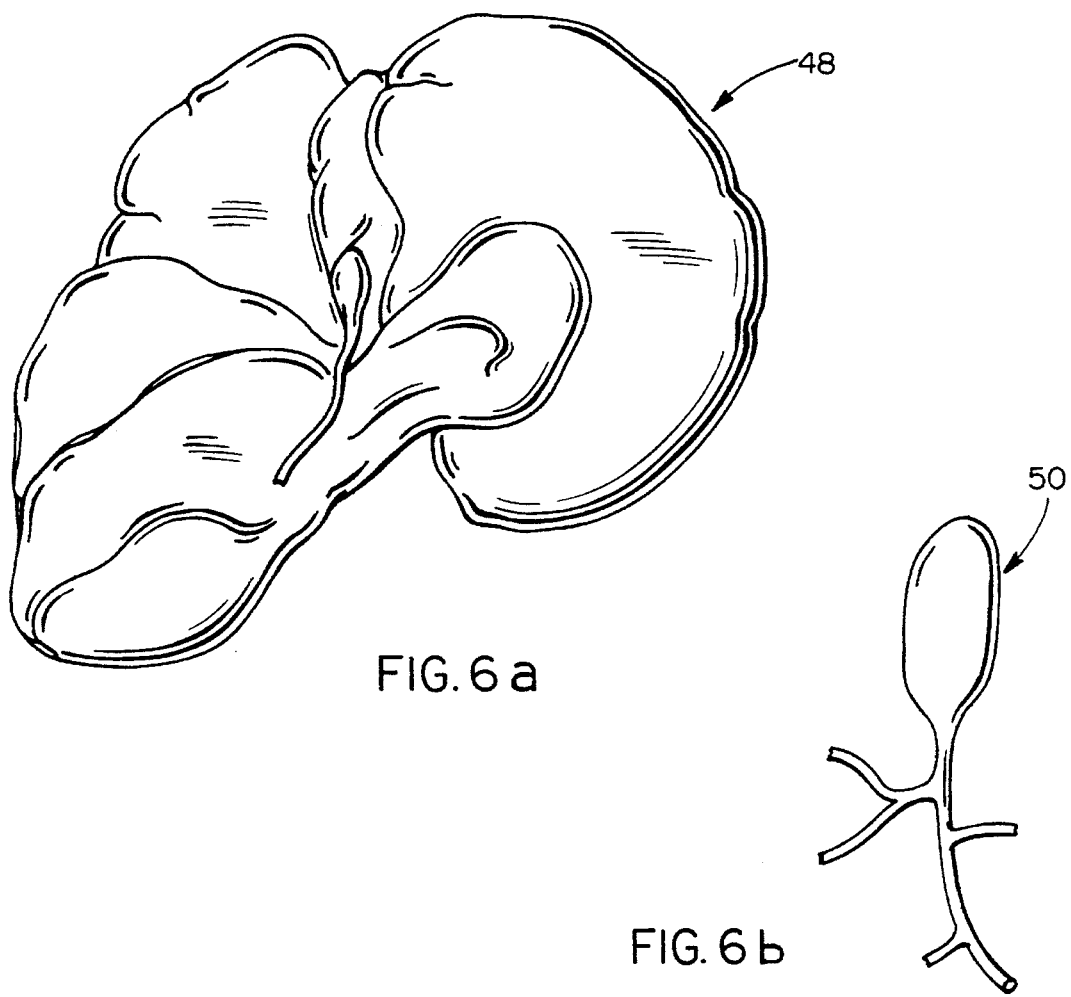
FIG. 6a
FIG. 6b 5,518,407

ANATOMICALLY CORRECT ARTIFICIAL ORGAN REPLICAS FOR USE AS TEACHING AIDS

BACKGROUND OF THE INVENTION

1. Field of the Invention

The present invention generally relates to teaching aids or training aids in the form of organ replicas or organ models each of which is anatomically correct and has the shape, size, vascular components and attachments that are found in live organs in various animals, humans and the like to facilitate teaching or training of students or other individuals in various medical or veterinarian practices. The training aid includes a body cavity model in which the interior is a replica of the inside of the abdominal area with all of the contours that are normally present and the exterior is a replica of the shape of the outside of the abdominal area with a relatively large hole or opening formed in the upper surface to allow for surgical exposure of the organ replicas or models positioned within the abdominal cavity. The organ replicas or models closely simulate living organs in appearance, texture, color, consistency and handling properties to form the replicas or models as lifelike as possible with the organ models feeling, handling, capable of being cut and sutured in the same manner as live organs with the colors of the organ models being determined by color matching each organ model with the color of an actual live organ during a surgical procedure. The organ replicas or models are held in the body cavity in apposed relation by retaining structures to maintain the relationship of the organ replicas in the body cavity in a manner similar to live organs being retained in the body cavity.

2. Description of Related Art

The prior art in this field of endeavor includes the use of simulated body components, organs and the like as well as the use of cadavers in teaching students in various medical and veterinarian practices. The following U.S. Pat. Nos. are relevant to this concept.

2,324,702
2,495,568
2,678,505
2,763,070
2,971,272
4,312,826

The prior patents disclose simulated organs but do not suggest the specific structure of the organ replicas or organ models of the present invention including the physical characteristics and associations of the replicas or models and do not show the specific association of the body cavity and the physical association of the organ replicas to the body cavity including the structure for retaining the organ replicas in their normal relationship to each other and their normal relationship to the body cavity. Also, the prior art does not disclose the organ replicas or models being anatomically correct as to the shape, size, vascular components, texture, color, consistency, attachments and handling properties which are very similar to that found in live organs and body cavities of humans and animals.

SUMMARY OF THE INVENTION

An object of the present invention is to provide anatomically correct organ replicas or models having many of the physical characteristics of actual live organs for use as teaching aids or training aids for use when teaching students or others various medical or veterinarian techniques and practices.

Another object of the invention is to provide a teaching aid including a body cavity having an open top area receiving organ replicas which are anatomically correct and oriented correctly in relation to each other, oriented correctly in relation to the body cavity and connected together in a manner similar to live human or animal organs.

A further object of the invention is to provide a teaching aid in accordance with the preceding objects in which the organ replicas have the shape, size, texture, color, consistency, handling properties, vascular components and attachments that are similar to organs found in live animals or humans. With the organ replicas having the feel characteristics, cutting characteristics and suture characteristics similar to live animal or human organs with the color of the organ replicas also being accurate as determined by color matching each organ replica with a live organ during surgery by the use of a color palate.

Still another object of the invention is to provide a teaching aid in accordance with the preceding objects in which a body cavity is constructed of smooth acrylic material having an interior that is a direct replica of the inside of an abdomen with all of the contours that are normally present in a live abdominal cavity and the outside surface is a replica of the shape of the outside of the abdomen with a large hole cut in the upper surface to allow for surgical exposure of the abdominal contents with the organ replicas being held in the body cavity in apposed relation to each other.

A still further object of the invention is to provide a teaching aid in accordance with the preceding objects in which the organ replicas are constructed of plastisol plastic provided with additives including hardeners, softeners and powders incorporated therein as necessary to obtain the correct appearance, texture, consistency, tear strengths and handling properties similar to living organs with the organ replicas being made by forming casts of actual live organs immediately after surgical removal with molds being made from the casts and the replicas made from the molds with each of the organ replicas being reusable and replaceable, cutable and suturable.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 5–13 are plan views of various organ replicas that are associated with the body cavity when the organ replicas are placed in the interior of the body cavity.

DESCRIPTION OF THE PREFERRED EMBODIMENT

The teaching aid of the present invention includes a body cavity 20 illustrated in FIGS. 1–4 and a plurality of organ replicas illustrated in FIGS. 5–13 which will be individually described. The disclosure in this application relates to organ replicas for a dog. However, the invention includes other organs, body cavities and structure for all animal and human species. The organs or models are anatomically correct in appearance, location in a body cavity and in relationship to each other. The organs or models are effective in teaching surgical and medical techniques which palpate, act and suture in a manner quite similar to live tissue.

The body cavity 20 and organ replicas are anatomically correct as is the abdominal cavity to simulate the anatomical and tissue handling characteristics as well as all other physical characteristics desired with the components of the teaching aid being formed during surgical procedures on a live dog in order that the body cavity and organ replicas are anatomically correct and provided with physical characteristics closely simulative of the live body cavity and live organs.

Figure 1:
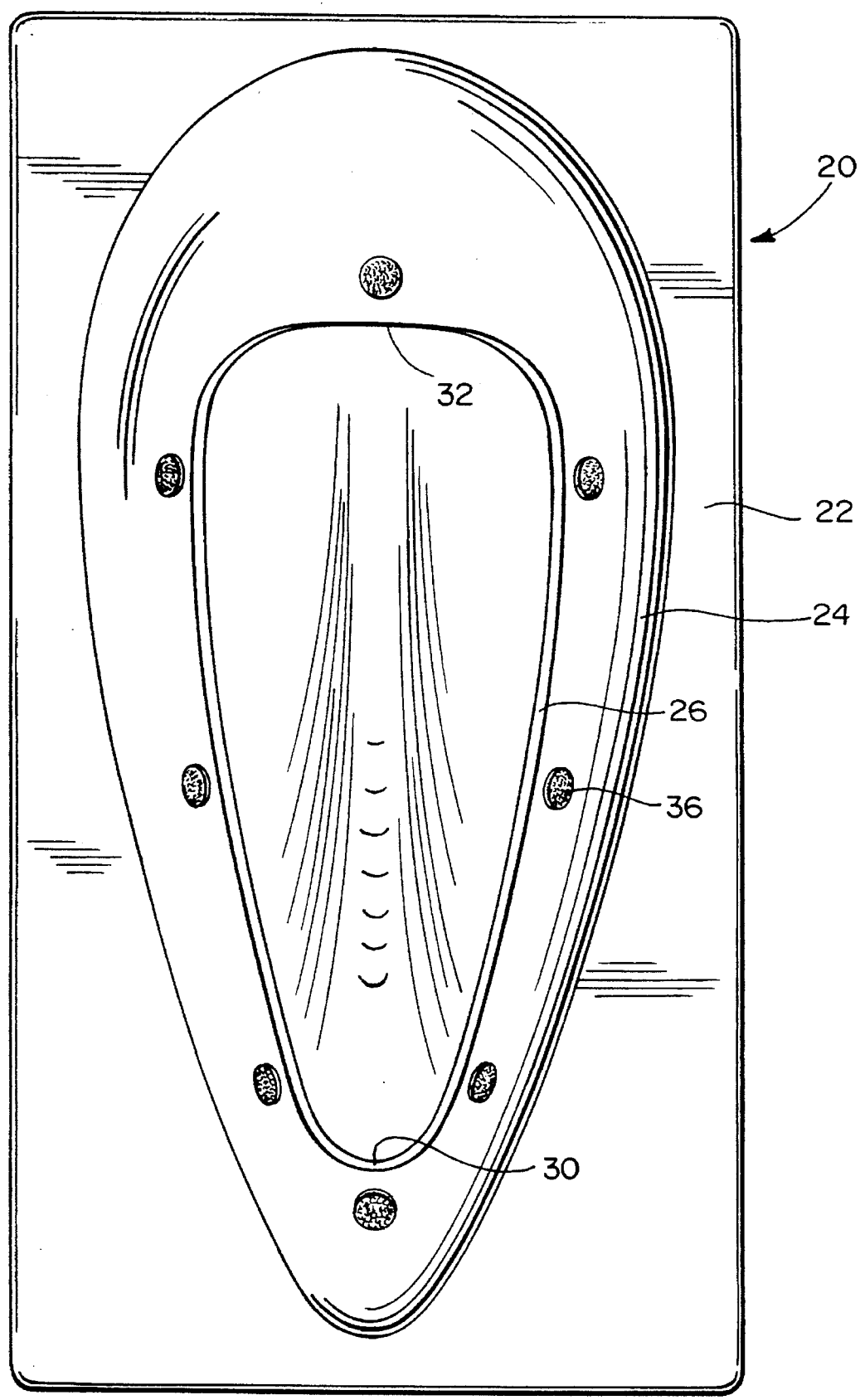
FIG. 1 is a top plan view of the body cavity component of the teaching aid of the present invention.
Figure 2:
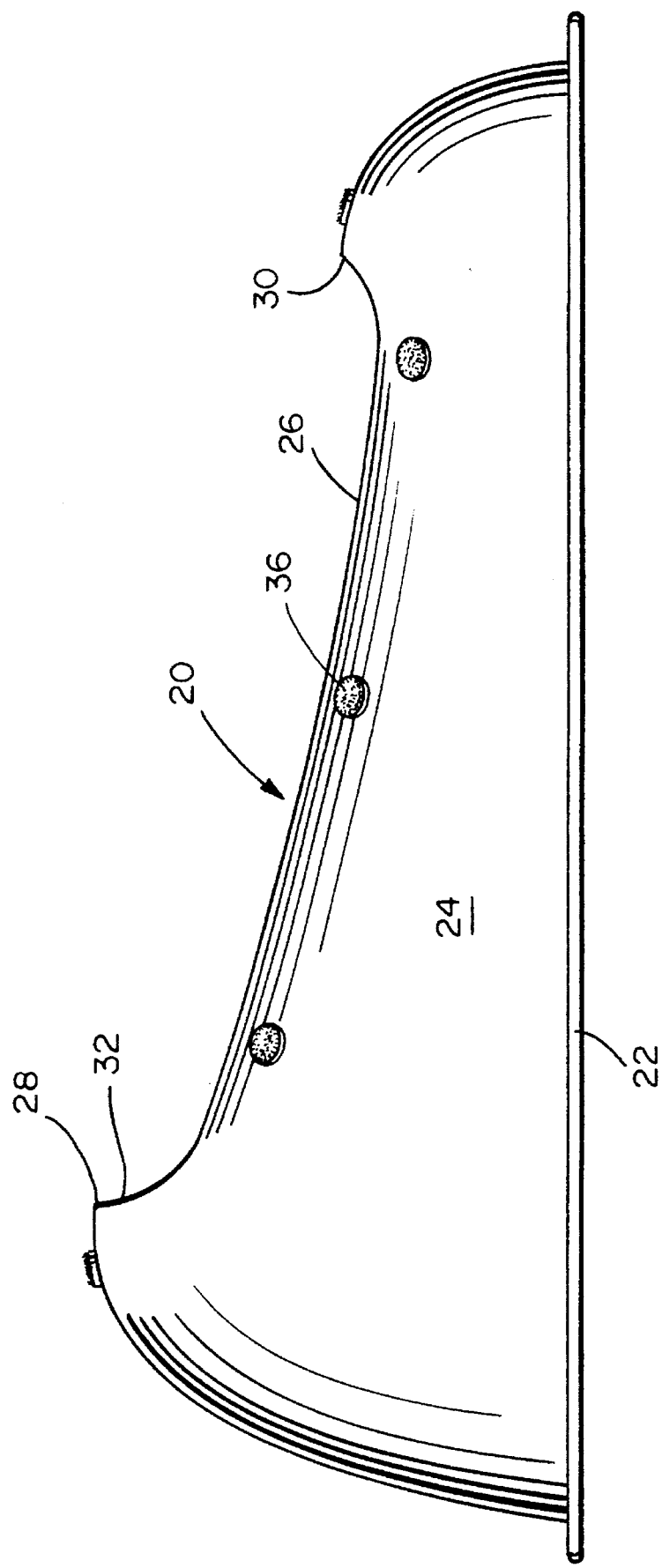
FIG. 2 is a side elevational view of a body cavity component.

The body cavity 20 includes a bottom panel or base 22 of generally rectangular configuration as illustrated in FIG. 1. However, the specific configuration of the panel or base 22 may vary depending upon the size of the body cavity. Extending upwardly from the panel or base 22 is a peripheral, inwardly and upwardly curved wall 24 that is integral with the panel 22 with the upper edge of the peripheral wall defining a generally oval shaped open area 26 with one end of the open area or large hole 26 being wider and generally straight across as indicated by reference numeral 28 and the other end being rounded and narrow as indicated by reference numeral 30. Also, as illustrated in FIG. 2, the end of the wall 26 which is wider at 28 is also vertically higher than the other end 30 and the end portions of the open area or hole are downwardly offset as indicated at reference numeral 32.

Figure 3:
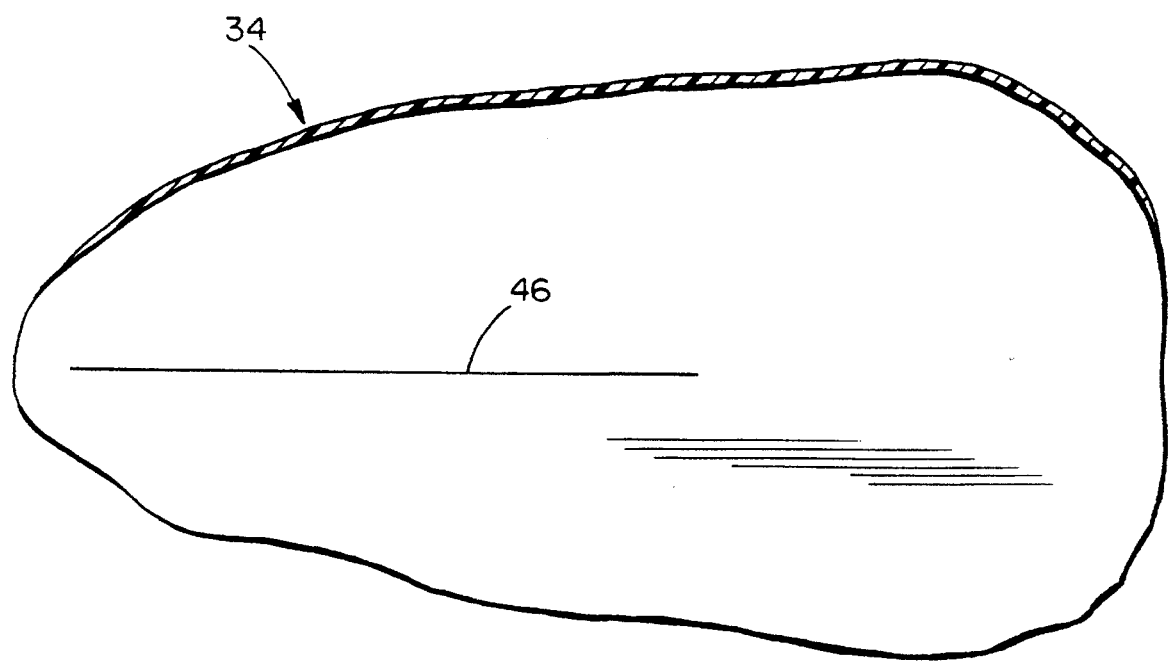
FIG. 3 is a plan view of a closure for the body cavity component.
Figure 4:
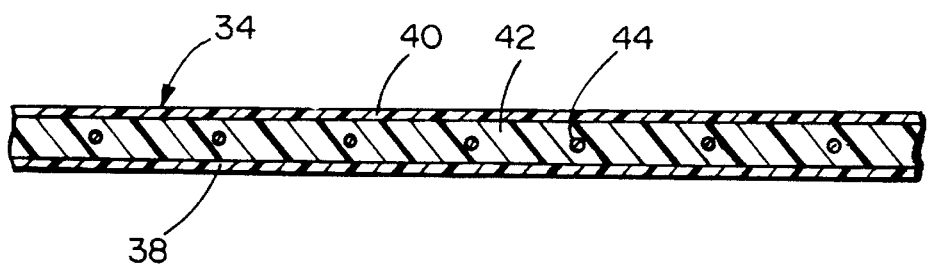
FIG. 4 is a sectional view of the closure, on an enlarged scale, illustrating the layered structure of the closure.

As illustrated in FIG. 4, a removable cover that fits over the opening 26 is illustrated and designated by reference numeral 34 which is secured to the body wall 24 in overlying relation to the hole or opening 26 by the use of patch areas 36 of hook and loop pile fastener material available under the trademark "VELCRO". The cover or closure for the body cavity is a three layered structure including an inner layer 38, an outer layer or skin 40 and a middle layer 42 which is a very soft subcutaneous tissue layer which has a plurality of vessels 44 running transversely through the middle layer 42. The outer layer 40 is a skin layer of plastisol plastic or the like and is tough to cut and the inner layer 38 is the body wall layer and is also tough to cut. A midline 46 is illustrated in FIG. 3 and when the layers are cut, they will be separated from the adjacent layers along the midline 46. The vessels 44 in the middle layer 42 are sufficiently strong that they can be isolated and individually ligated.

The individual organ replicas or organ models are constructed of plastisol of various hardness and tear strength, modified by hardeners, softeners and powders illustrated in FIGS. 5–13. As illustrated in FIGS. 5 and 6, the liver is a 7 lobed organ model 48. The lobes are anatomically arranged as they are in the live dog. The lobes are attached to one another with the use of heat, ligatures and adhesive. Within each lobe is a vessel/duct system made of a soft and flexible plastic which is harder and stronger than the surrounding liver tissue. The number of vessels/ducts within each lobe increases and their size decreases in the peripheral portion of the lobe when compared with the central part.

The gall bladder 50 is a hollow, single layered organ model. It sits in the gall bladder fossa of the liver. It is held in position by surrounding structures and by ligatures and adhesive. There is a duct system consisting of the cystic duct, hepatic ducts, and the common bile duct attached to the gall bladder. The common bile duct enters the proximal duodenum.

Figure 7:
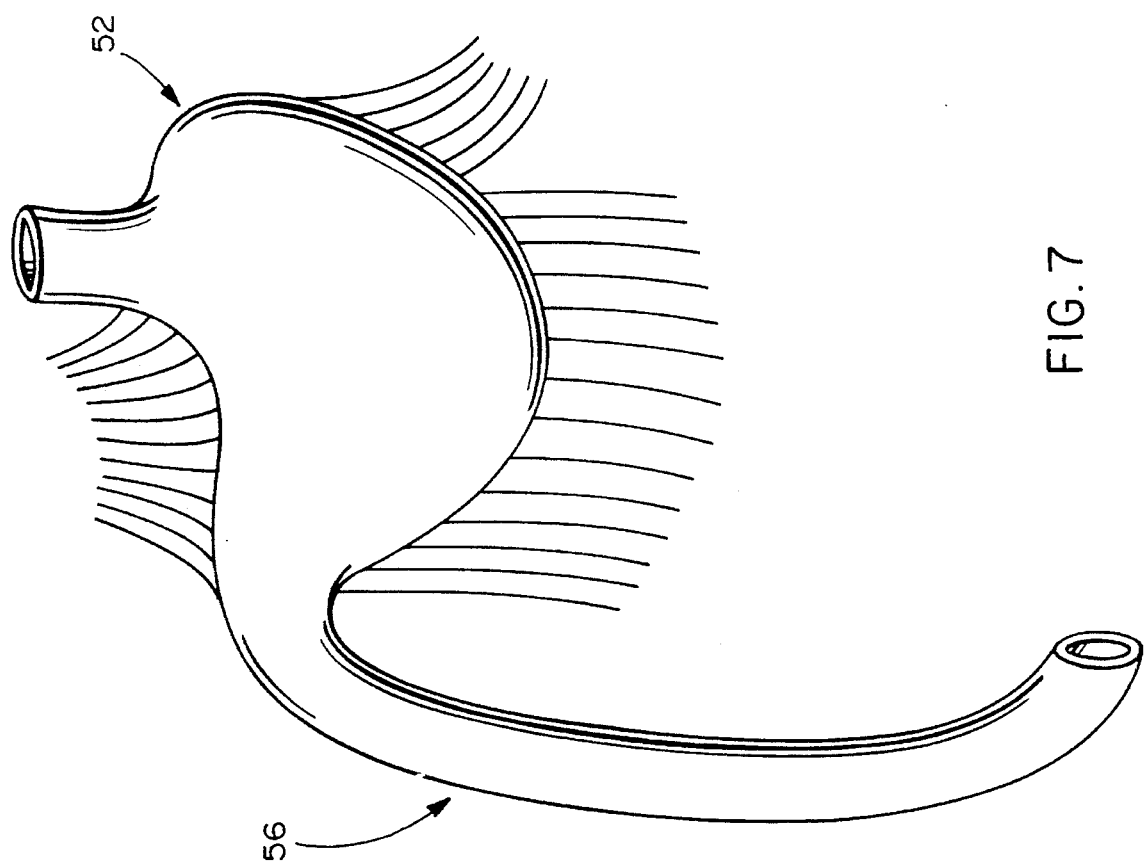

As illustrated in FIG. 7, the stomach 52 is a large, hollow, two layered organ model. It is anatomically correct and has greater and lesser curvatures and all 5 regions of the stomach. When cut, the two layers divide and the inner layer everts. The distal esophagus is attached to the stomach proximally and the duodenum attaches to the distal end of the stomach. The greater omentum attaches along the greater curvature of the stomach. Additionally, the gastrosplenic ligament containing short gastric and left gastroepiploic vessels attaches along the greater curvature. This attachment has been made using heat and ligatures or could be made with "VELCRO". The mesentery and associated vessels is also attached to the spleen. The left limb of the pancreas is connected with a sheet of greater omentum and attached to the stomach with ligatures, adhesive, heat, and/or "VELCRO".

Figure 8:
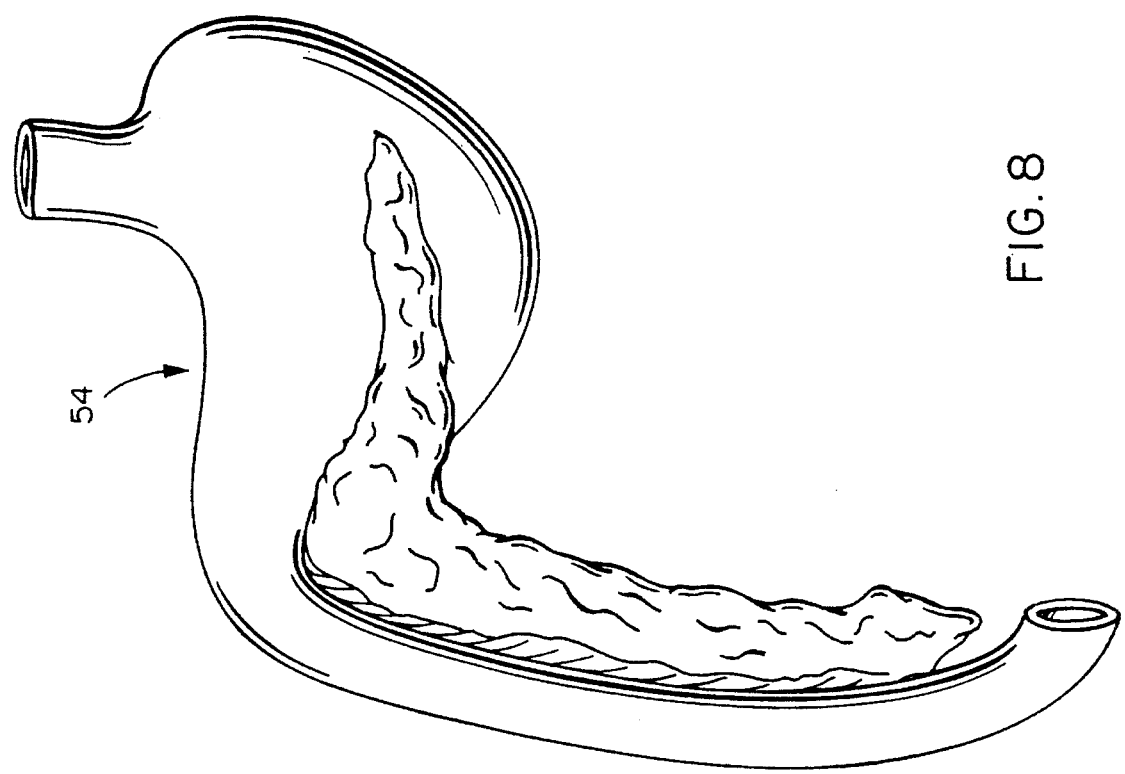

As illustrated in FIG. 8, the pancreas 54 is an organ with a textured surface. It has right and left limbs and a body. The right limb of the pancreas is attached to the descending duodenum and the left limb is attached to the stomach by ligatures, adhesive and "VELCRO". The right limb of the pancreas sits in the mesoduodenum. The left limb of the pancreas sits in a sheet of the greater omentum.

As illustrated in FIG. 7, the duodenum 56 is a hollow, two-layered loop of bowel that runs from the distal portion of the stomach to the underside of the solid mass of jejunum. It is attached to the stomach and the jejunum with ligatures, adhesive and "VELCRO". The mesoduodenum attaches the duodenum to the right side of the body cavity. The right limb of the pancreas is within the mesoduodenum.

Figure 9:
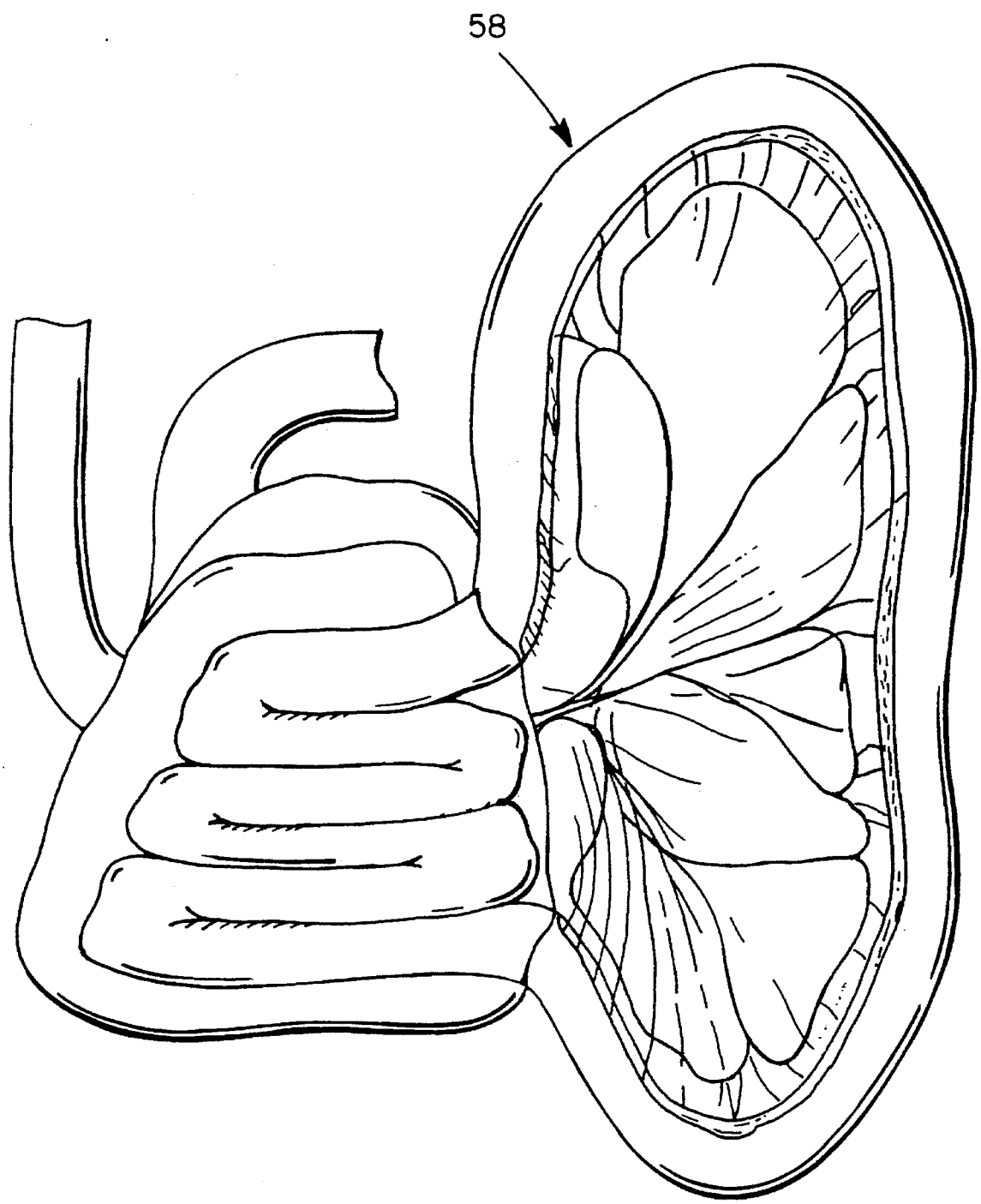

As illustrated in FIGS. 9, the jejunum model 58 has two parts. The first is a solid mass of small intestine that sits in the middle of the body cavity. The ascending duodenum and ascending colon attach to the underside of the mass of small intestines with ligatures. The second portion of this model is an exteriorizable loop of jejunum, approximately 16 inches long, with its attached mesentery and blood supply. The loop of jejunum is hollow with a two-layered wall. When cut, the layers separate. The mesentery has the appropriate blood vessels for the exteriorizable loop of bowel. The mesentery is attached to the loop of jejunum by adhesive and is tacked down to the bottom of the body cavity. Both ends of the exteriorizable loop of jejunum attach to the solid mass of jejunum with ligatures, heat and adhesive.

Figure 10:
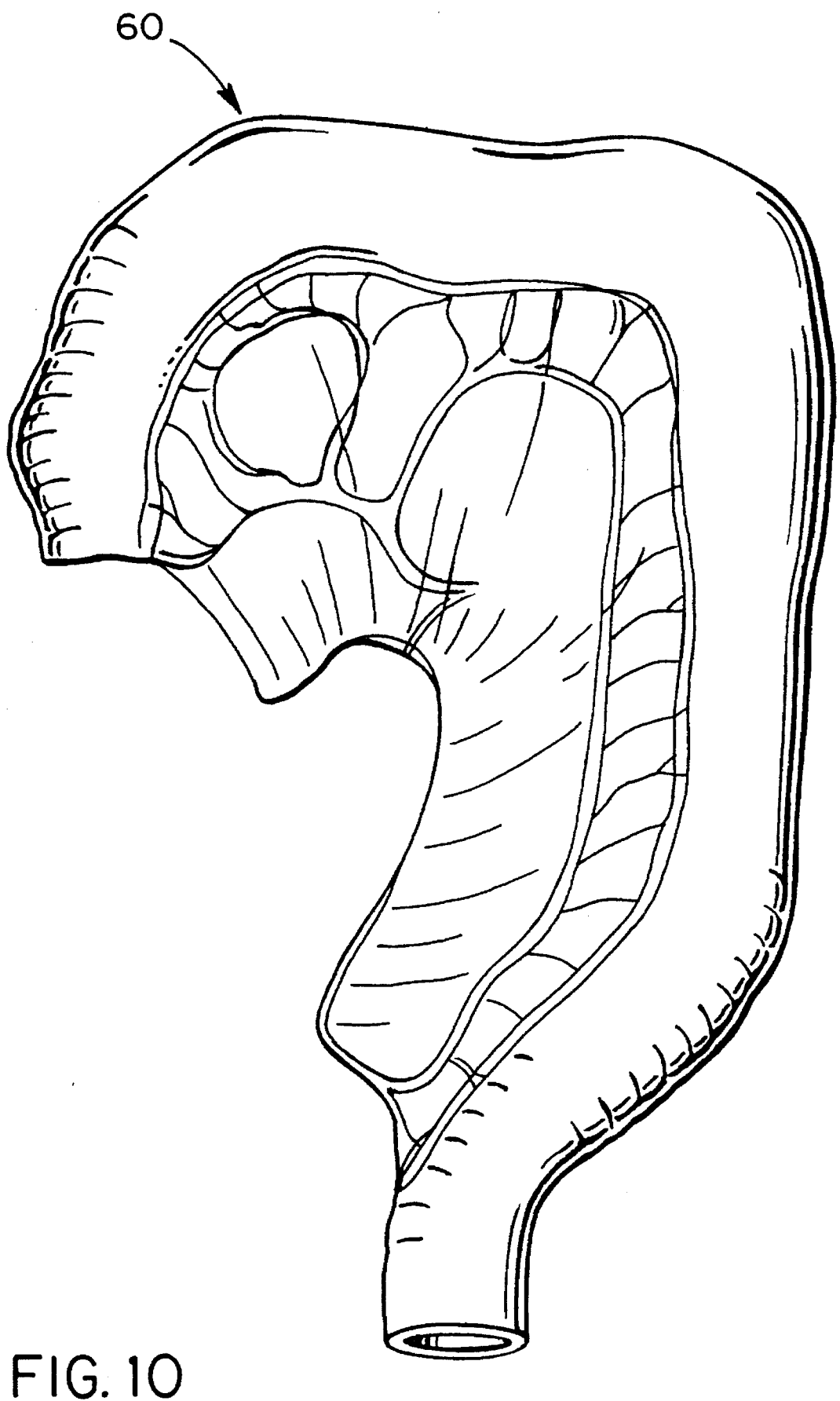

As illustrated in FIG. 10, the colon 60 is a hollow loop of bowel that has ascending, transverse and descending portions. It is attached proximally to the underside of the mass of jejunum with ligatures, adhesive and "VELCRO". The distal end extends to the distal end of the body cavity. A mesentery with vessels attaches the descending portion of the colon to the left side of the body cavity. The colon is dorsal to the uterus and urinary bladder in the pelvic canal region.

Figure 11A:
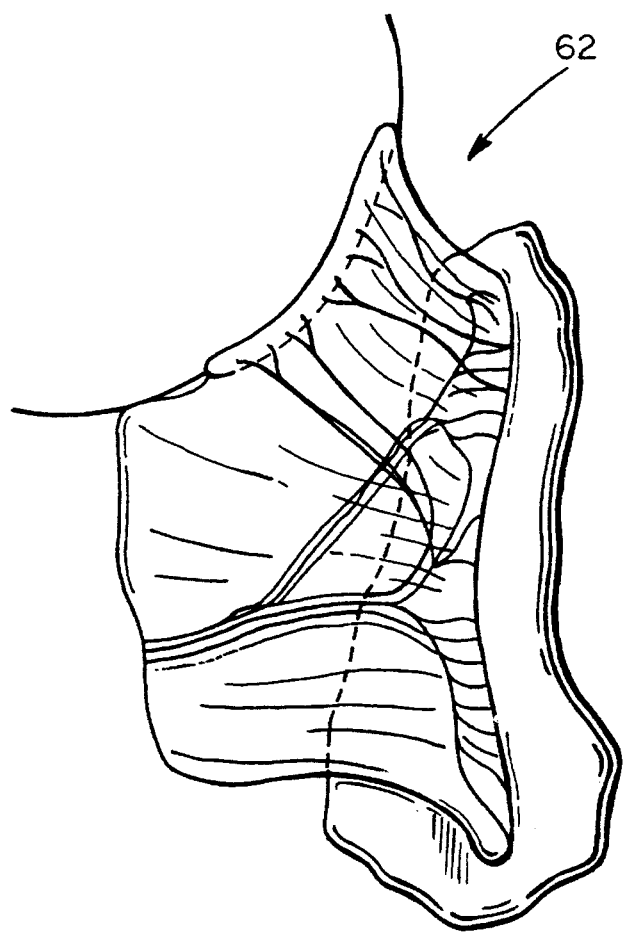
Figure 11B:
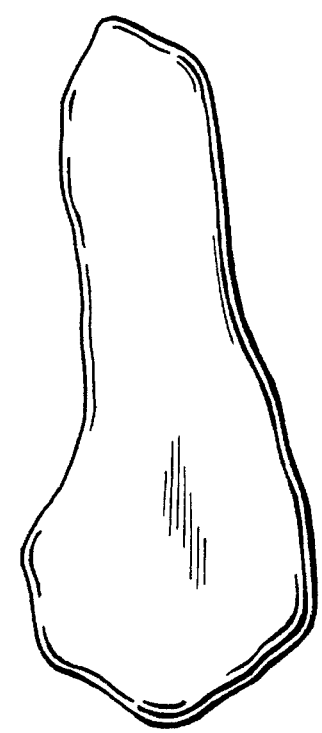

As illustrated in FIG. 11, the spleen 62 is a solid organ model with its attached blood vessels and mesenteries. The surface of the spleen is textured and is covered by a very thin capsule. The splenic vessels are anatomically correct and are incorporated into the greater omentum. The mesentery and splenic artery and vein are tacked down to the floor of the body cavity. The mesentery and vessels of the splenic hilar region are attached to the spleen with adhesive. The left gastroepiploic vessels and short gastric vessels are in the gastrosplenic ligament portion of the mesentery and attach to the stomach along the greater curvature as well as to the spleen.

Figure 12:
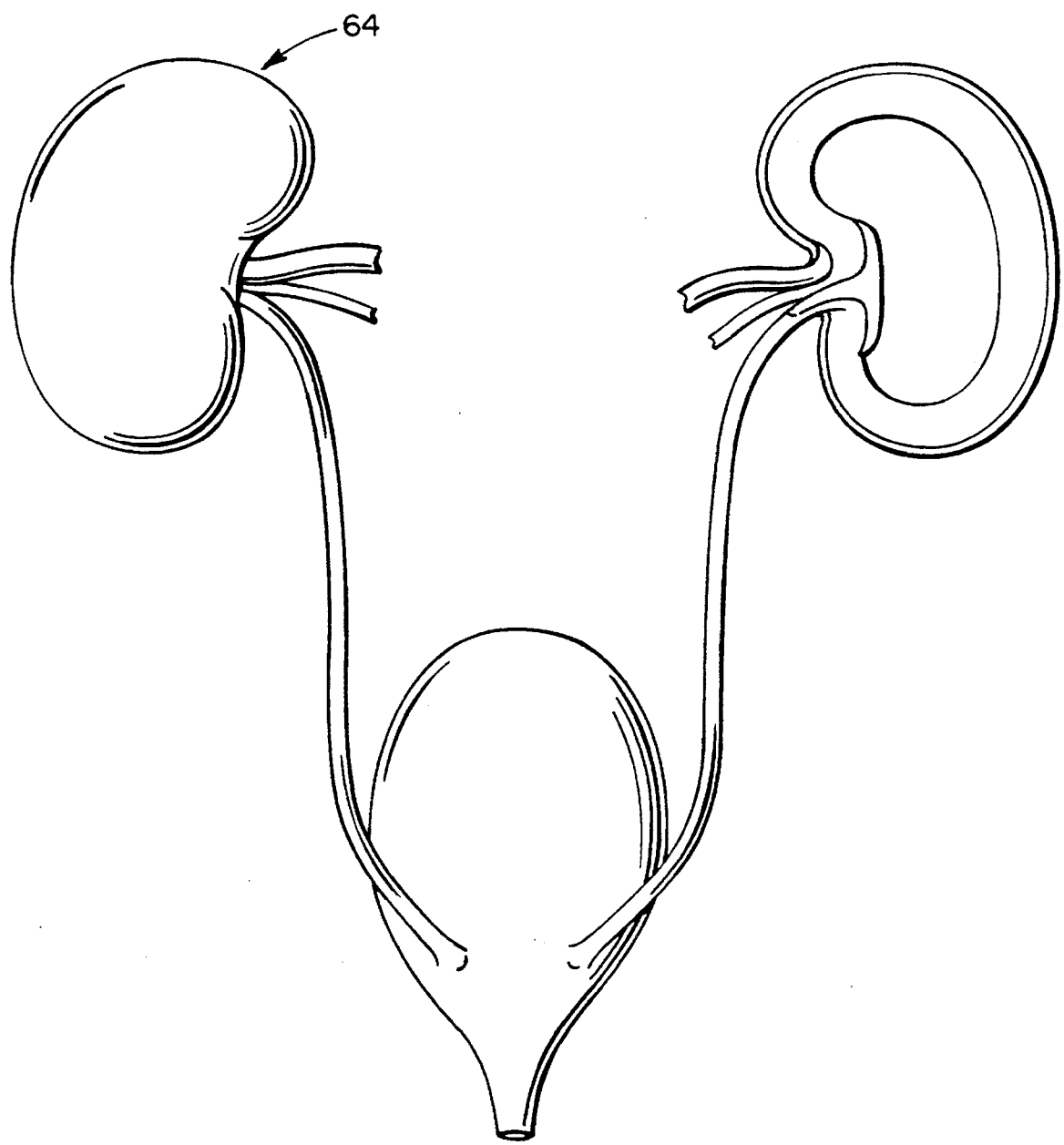

As illustrated in FIG. 12, there are two kidneys 64 per body cavity. Each kidney model is a three layered organ with a capsule. There is a hollow renal pelvis and two solid layers, the renal medulla and renal cortex. The medulla and cortex are of different colors. The whole kidney is covered by a capsule which is thick and tough enough to hold sutures. When incised, the capsule retracts back from the underlying renal parenchyma. Each kidney also has a hollow renal artery and a hollow renal vein. A smaller diameter hollow structure, the ureter 66, is also present and connects the kidney with the urinary bladder 68. The kidneys sit in the renal fossas within the floor of the body cavity and held in place by ligatures and "VELCRO" so that they are slightly movable but cannot be exteriorized. The urinary bladder 68 is a hollow, thick walled, two-layered organ which sits in the pelvic canal and caudal abdomen. The ureters 66 enter the neck of the bladder from the kidneys. The hollow urethra descends from the bladder to within the pelvic canal. The surface of the bladder is textured to contain the superficial vessels that are present in the bladder wall. When cut, the two layers of the bladder wall are visible but they do not separate. In the caudal abdomen, the bladder is dorsal to the uterus.

Figure 13:
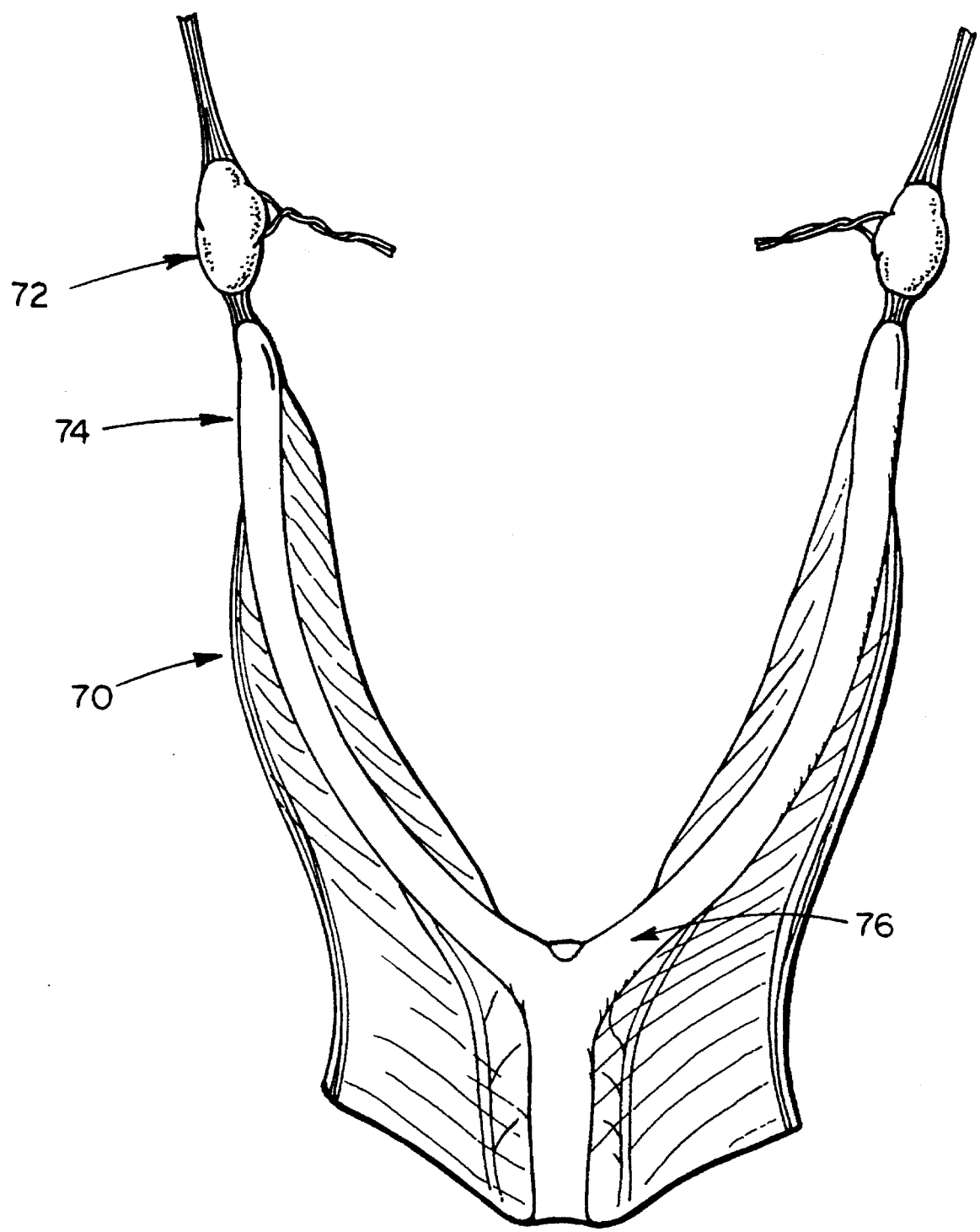

As illustrated in FIG. 13, the uterus 70 is a solid or hollow organ model. It has two ovaries 72 attached, two horns 74, a uterine body 76, and a cervix. The ligamentous attachments (suspensory, mesovarium, and mesometrium) are present and attach the uterus to the body cavity in the proper locations along the right and left sides. The cervix is a palpable structure and sits between the urinary bladder and the descending colon in the caudal abdomen. The bladder, uterus and colon are attached to one another in the caudal abdomen with ligatures and "VELCRO". Uterine and ovarian vessels are in the appropriate mesenteries.

The various organ models or replicas can be connected to each other and to the interior of the body cavity by various techniques including connection by heat bonding of plastic components, ligatures, adhesive, "VELCRO" and the various organ models are duplicative of live animal organs and are capable of cutting, removal, suturing and otherwise performing in substantially the same manner as live organs. This structure enables artificial organs to be utilized in instructional procedures thereby eliminating the use of cadavers for instructional purposes thereby providing a replaceable source of teaching aids which will eliminate problems which have been encountered in some instances by the use of cadavers for instructional purposes.

The foregoing is considered as illustrative only of the principles of the invention. Further, since numerous modifications and changes will readily occur to those skilled in the art, it is not desired to limit the invention to the exact constructions and operation shown and described, and, accordingly, all suitable modifications and equivalents may be resorted to, falling within the scope of the invention.

What is claimed as new is as follows:

1. A teaching aid for teaching medical and veterinarian practices comprising a plurality of organ replicas, each of said organ replicas being constructed of a soft plastic material that can be cut with a surgical knife or the like and sutured with a suture needle and suture material, each organ replica being simulative of a live organ and being anatomically correct as to the shape, size, texture, color, consistency, handling properties, vascular components and attachments to enable the organ replicas to be handled and subjected to various surgical techniques for instructing individuals in such techniques, and a body cavity model for receiving said organ replicas, said body cavity model including a base having an upwardly extending and inwardly curved wall thereon, said wall being simulative of the abdominal wall of a live animal, said wall including an opening in a top portion thereof providing access to the interior of the cavity for positioning the organ replicas therein and providing surgical access to the organ replicas, a closure cover for the opening in the body cavity wall, and means detachably securing the cover to the body cavity wall, said cover being provided with an inner layer, an outer layer and an intermediate layer with the inner and outer layers being spaced apart, said intermediate layer simulating subcutaneous tissue and including vessels extending therethrough constructed in a manner to enable the vessels to be isolated and ligated.

2. The teaching aid as defined in claim 1 wherein said organ replicas are constructed of plastisol plastics incorporating additives to obtain an organ replica that is anatomically and texturally correct.

3. The teaching aid as defined in claim 1 wherein said organ replicas include means for securing the organ replicas in the same relationship as the relationship of live organs.

4. The teaching aid as defined in claim 1 wherein an interior surface of the wall and cover simulates the interior of the abdominal cavity of a live animal and an exterior surface of the wall and cover simulates the exterior surface of an abdominal cavity of a live animal.

5. The teaching aid as defined in claim 1 wherein said body cavity model is constructed of a hard, smooth surfaced plastic material, said organ replicas being securely retained within the body cavity model in apposed relation.

6. The teaching aid as defined in claim 1 wherein said organ replicas are colored to substantially the exact color of live organs by comparing the color of the organ replicas with live organs during surgery on a live animal.

7. In a teaching aid for medical techniques, a body cavity model including a substantially rigid base having a generally planar upper surface, an upstanding body cavity defining wall rigid with said base, said wall being shaped to closely simulate the anatomical shape of a body component, said wall including an open area in an upper portion thereof providing access to the interior of the cavity for positioning and providing access to simulated body components received within the wall, and a closure member for the open area in the upper portion of the wall, said closure member forming a continuation of the wall to simulate a complete body cavity defining wall when in place, and means detachably connecting the closure member to the body cavity defining wall to provide access to the interior of the body cavity defining wall, said closure member including layers including an outer and inner layer which resist cutting but which can be separated along a midline by cutting, the space between the layers being filled with simulated subcutaneous tissue and the outer layer simulating the outer skin of a body component.

8. In a teaching aid for medical techniques, a body cavity model comprising a substantially rigid base having a generally planar upper surface, an upstanding body cavity defining wall rigid with said base, said body cavity defining wall being shaped to closely simulate the anatomical external shape of a body component, said body cavity defining wall including an internal surface constructed to closely simulate the interior surface of a body cavity of a live animal, said body cavity defining wall including an open area in an upper portion thereof providing access to the interior of the cavity for positioning and providing surgical exposure to simulated organ replicas received within the body cavity defining wall, and a closure member for the open area in the upper portion of the body cavity defining. Wall, said closure member forming a continuation of the body cavity defining wall to simulate a live animal body cavity defining wall to conceal from observation organ replicas within the body cavity defining wall, said closure member including layers including an outer skin layer, an inner layer and an intermediate layer, said inner and outer layers resisting cutting, the intermediate layer being simulated subcutaneous tissue and the outer layer simulating the outer skin of a body component.

9. The teaching aid as defined in claim 8 wherein said intermediate layer includes vessels extending therethrough and constructed to enable the vessels to be isolated and ligated.

10. The teaching aid as defined in claim 8 wherein said closure member and body cavity defining wall include coacting means to releaseably mount said closure member in closing relation to said open area in the upper portion of said body cavity defining wall.

\* \* \* \* \*